United States Patent
Liu et al.

(10) Patent No.: US 10,867,162 B2
(45) Date of Patent: Dec. 15, 2020

(54) DATA PROCESSING APPARATUS, DATA PROCESSING METHOD, AND NON-TRANSITORY STORAGE MEDIUM

(71) Applicant: NEC Corporation, Tokyo (JP)

(72) Inventors: Jianquan Liu, Tokyo (JP); Shoji Nishimura, Tokyo (JP); Takuya Araki, Tokyo (JP); Yasufumi Hirakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 98 days.

(21) Appl. No.: 15/773,239

(22) PCT Filed: Oct. 25, 2016

(86) PCT No.: PCT/JP2016/081526
§ 371 (c)(1),
(2) Date: May 3, 2018

(87) PCT Pub. No.: WO2017/077902
PCT Pub. Date: May 11, 2017

(65) Prior Publication Data
US 2018/0330151 A1    Nov. 15, 2018

(30) Foreign Application Priority Data

Nov. 6, 2015   (JP) ................... 2015-218164

(51) Int. Cl.
*G06K 9/00*   (2006.01)
*G06F 16/783*   (2019.01)
*G06F 16/00*   (2019.01)

(52) U.S. Cl.
CPC ......... *G06K 9/00261* (2013.01); *G06F 16/00* (2019.01); *G06F 16/783* (2019.01);
(Continued)

(58) Field of Classification Search
CPC .................................................. G06K 9/00288
See application file for complete search history.

(56) References Cited

U.S. PATENT DOCUMENTS

| 2008/0074496 A1* | 3/2008 | Venetianer ....... G08B 13/19602 |
| | | 348/150 |
| 2009/0175509 A1* | 7/2009 | Gonion ................ G06K 9/6253 |
| | | 382/118 |

(Continued)

FOREIGN PATENT DOCUMENTS

| JP | 2011-186733 A | 9/2011 |
| JP | 2013-257765 A | 12/2013 |

(Continued)

OTHER PUBLICATIONS

Duy-Dinh Le et al., "Nii-Kaori-Person-Search: A General Framework for Indexing and Retrieving People's Appearance in Large Video Archives," 2011 Fifth IEEE International Conference on Semantic Computing, Sep. 18, 2011, 5 pages.

(Continued)

*Primary Examiner* — Oneal R Mistry
(74) *Attorney, Agent, or Firm* — Sughrue Mion, PLLC

(57) ABSTRACT

A data processing apparatus (1) of the present invention includes a unit that retrieves a predetermined subject from moving image data. The data processing apparatus includes a person extraction unit (10) that analyzes moving image data to be analyzed and extracts a person whose appearance frequency in the moving image data to be analyzed satisfies a predetermined condition among persons detected in the moving image data to be analyzed, and an output unit (20) that outputs information regarding the extracted person.

29 Claims, 16 Drawing Sheets

(52) U.S. Cl.
CPC ..... *G06K 9/00288* (2013.01); *G06K 9/00295* (2013.01); *G06K 9/00342* (2013.01)

(56) References Cited

U.S. PATENT DOCUMENTS

| | | | |
|---|---|---|---|
| 2010/0026802 A1* | 2/2010 | Titus | G08B 13/19608 348/143 |
| 2010/0201820 A1* | 8/2010 | Lopota | G08B 13/1961 348/152 |
| 2011/0145232 A1 | 6/2011 | Chang et al. | |
| 2012/0124029 A1 | 5/2012 | Kant | |
| 2013/0060786 A1 | 3/2013 | Serrano et al. | |
| 2013/0329059 A1* | 12/2013 | Uchikoshi | G06F 3/005 348/207.1 |
| 2014/0105573 A1 | 4/2014 | Hanckmann et al. | |
| 2014/0161314 A1* | 6/2014 | Ostrovsky-Berman | G06F 16/7837 382/103 |
| 2016/0092736 A1* | 3/2016 | Mai | G06K 9/00624 |

FOREIGN PATENT DOCUMENTS

| | | |
|---|---|---|
| JP | 2014-016968 A | 1/2014 |
| JP | 2015-049574 A | 3/2015 |
| WO | 2014/109127 A1 | 7/2014 |

OTHER PUBLICATIONS

International Search Report of PCT/JP2016/081526 dated Jan. 31, 2017.
Communication dated Mar. 5, 2020, from the United States Patent and Trademark Office in U.S. Appl. No. 16/545,376.
Communication dated Aug. 5, 2020, issued by the U.S. Patent and Trademark Office in U.S. Appl. No. 16/545,376.

* cited by examiner

FIG. 4

| PERSON ID | TIME WINDOW ID | | |
|---|---|---|---|
| | 0001 | 0002 | · · · · |
| 000001 | ✓ | ✓ | · · · · |
| 000002 | ✓ | ✓ | · · · · |
| ⋮ | ⋮ | ⋮ | · · · · |
| 000073 | | ✓ | · · · · |
| ⋮ | ⋮ | ⋮ | ⋮ |

FIG. 5

| DETECTION ID | FEATURE VALUE | FRAME ID | FACE IMAGE FILE ID |
|---|---|---|---|
| ⋮ | ⋮ | ⋮ | ⋮ |

FIG. 6

| PERSON ID | DETECTION ID | | |
|---|---|---|---|
| 000001 | F0001-0001 | F0002-0001 | · · · · |
| ⋮ | ⋮ | ⋮ | ⋮ |

FIG. 11
|  | 5/4 | 5/5 | 5/6 |
|---|---|---|---|
|  | ✓ | ✓ | ✓ |
|  | ✓ | | |
|  | ✓ | | |
|  | | ✓ | |
|  | | ✓ | |
|  | | | ✓ |
|  | | | ✓ |
|  | | | ✓ |

FIG. 13

| PERSON ID | CHILD DATA ID | | |
|---|---|---|---|
| | P001 | P002 | .... |
| 000001 | ✓ | | .... |
| 000002 | ✓ | ✓ | .... |
| ⋮ | ⋮ | ⋮ | .... |
| 000073 | | ✓ | .... |
| ⋮ | ⋮ | ⋮ | ⋮ |

FIG. 14
| | A'S HOME | B'S HOME | C'S OFFICE |
|---|---|---|---|
|  | ✓ | ✓ | ✓ |
|  | ✓ | | |
|  | ✓ | ✓ | |
|  | | ✓ | |
|  | | ✓ | |
|  | | | ✓ |
|  | | | ✓ |
|  | | | ✓ |
. . . .

DATA PROCESSING APPARATUS, DATA PROCESSING METHOD, AND NON-TRANSITORY STORAGE MEDIUM

CROSS REFERENCE TO RELATED APPLICATIONS

This application is a National Stage of International Application No. PCT/JP2016/081526 filed Oct. 25, 2016, claiming priority based on Japanese Patent Application No. 2015-218164 filed Nov. 6, 2015, the entire contents of which are incorporated herein.

TECHNICAL FIELD

The present invention relates to a data processing apparatus, a data processing method, and a program.

BACKGROUND ART

Patent Document 1 discloses a retrieval apparatus that retrieves a specified person from an image. The retrieval apparatus includes: a first acquisition unit that acquires an image including a plurality of frames; a first extraction unit that extracts a plurality of persons included in the frames and extracts a plurality of types of first attributes characterizing the person; a second extraction unit that extracts a plurality of types of second attributes characterizing the person from a first person specified by the user; a retrieval unit that retrieves the first person from the frames by using at least one type of the second attributes as a retrieval condition; and an addition unit that, in a case where the first person is retrieved by the retrieval unit and the first person includes an attribute different from the first attribute and the second attribute, adds at least one type of a different attribute as a new condition for retrieval.

Patent Documents 2 and 3 disclose an index generation apparatus that generates indexes in which a plurality of nodes are hierarchized.

RELATED DOCUMENT

Patent Document

[Patent Document 1] Japanese Patent Application Publication No. 2014-16968
[Patent Document 2] PCT International Publication No. WO2014/109127
[Patent Document 3] Japanese Patent Application Publication No. 2015-49574

SUMMARY OF THE INVENTION

Technical Problem

The retrieval apparatus described in Patent Document 1 retrieves moving image data by using the feature value of a person specified by the user as a key. In the case of using this retrieval apparatus, the user needs to specify the person to be retrieved for in advance and provide the retrieval apparatus with the feature value of the person. In a case where a person to be retrieved is not identified, the retrieval apparatus cannot be used.

A similar problem occurs in the case of analyzing text data. That is, in a case where a word or a sentence to be retrieved is specified in advance, it is possible to retrieve the desired word or sentence from the text data by providing the retrieval apparatus with the word or the sentence as a retrieval key. However, in a case where a word or a sentence to be retrieved is not identified in advance, the retrieval cannot be executed.

In addition, a similar problem occurs in the case of analyzing other pieces of data, such as voice data, music data, image data, figure data, fingerprint data, biometric information, time series data (stock price fluctuation time series data and the like), file archive, object file, and binary data.

It is an object of the present invention to provide a new technique for retrieving a subject satisfying a predetermined condition from data.

Solution to Problem

According to the present invention, there is provided a data processing apparatus, including: an extraction unit that analyzes data to be analyzed and extracts a subject whose appearance frequency in the data to be analyzed satisfies a predetermined condition among subjects detected in the data to be analyzed; and an output unit that outputs information regarding the extracted subject.

According to the present invention, there is provided a data processing method executed by a computer, the method comprising: an extraction step of analyzing data to be analyzed and extracting a subject whose appearance frequency in the data to be analyzed satisfies a predetermined condition among subjects detected in the data to be analyzed; and an output step of outputting information regarding the extracted subject.

According to the present invention, there is provided a program causing a computer to function as: an extraction unit that analyzes data to be analyzed and extracts a subject whose appearance frequency in the data to be analyzed satisfies a predetermined condition among subjects detected in the data to be analyzed; and an output unit that outputs information regarding the extracted subject.

Advantageous Effects of Invention

According to the present invention, a new technique for retrieving a subject satisfying a predetermined condition from data is achieved.

BRIEF DESCRIPTION OF THE DRAWINGS

The above-described object and other objects, features, and advantages will become more apparent by preferred example embodiments described below and the following accompanying diagrams.

FIG. 4 is a schematic diagram for explaining the determination result of a person extraction unit of the present example embodiment.

FIG. 5 is a schematic diagram for explaining information generated by the person extraction unit of the present example embodiment.

FIG. 6 is a schematic diagram for explaining detected person information according to the present example embodiment.

FIG. 11 is an example of output information from the output unit of the present example embodiment.

FIG. 13 is a schematic diagram for explaining the determination result of the person extraction unit of the present example embodiment.

FIG. 14 is an example of output information from the output unit of the present example embodiment.

DESCRIPTION OF EMBODIMENTS

Figure 1:
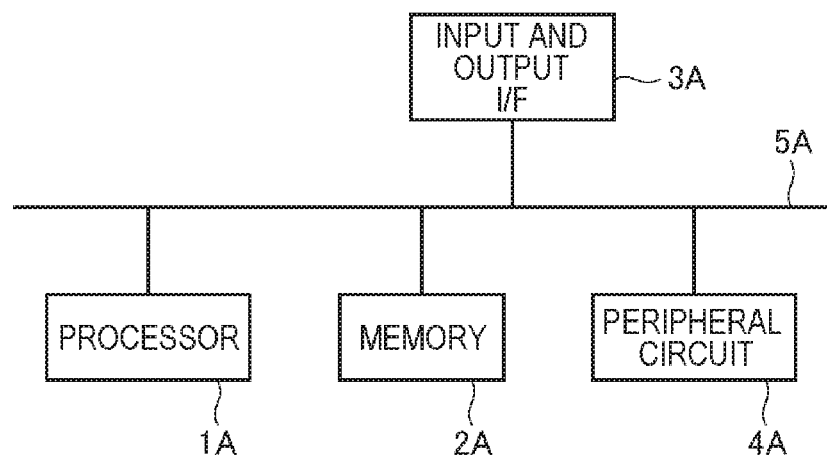
FIG. 1 is a diagram showing an example of the hardware configuration of an apparatus of the present example embodiment.

First, an example of the hardware configuration of an apparatus (data processing apparatus) of the present example embodiment will be described. FIG. 1 is a block diagram illustrating the hardware configuration of the apparatus of the present example embodiment. As shown in FIG. 1, the apparatus has a processor 1A, a memory 2A, an input and output interface 3A, a peripheral circuit 4A, and a bus 5A. The peripheral circuit includes various modules.

The bus 5A is a data transmission line in a case where the processor 1A, the memory 2A, the peripheral circuit 4A, and the input and output interface 3A transmit and receive data to and from each other. The processor 1A is an arithmetic processing apparatus, such as a central processing unit (CPU) or a graphics processing unit (GPU), for example. The memory 2A is a memory, such as a random access memory (RAM) or a read only memory (ROM), for example. The input and output interface 3A includes an interface for acquiring information from an external apparatus, an external server, or the like. The processor 1A issues a command to each module, and performs calculations based on the calculation results of the modules.

Hereafter, the present example embodiment will be described. Each functional block diagram used in the explanation of the following example embodiments does not show a hardware-unit configuration but shows a block of functional units. Although each apparatus is implemented by one apparatus in these diagrams, the implementation means is not limited thereto. That is, a physically divided configuration or a logically divided configuration may also be adopted. The same components are denoted by the same reference numerals, and the explanation thereof will not be repeated.

First Example Embodiment

First, the outline of the present example embodiment will be described. In a data processing apparatus of the present example embodiment, data to be analyzed is moving image data captured at the same place over a predetermined time period. The data processing apparatus analyzes the moving image data, and extracts a person whose appearance frequency (for example, the number of appearances or an appearance rate) in the moving image data satisfies a predetermined condition (for example, higher than a predetermined level) among persons detected in the moving image data. Then, information regarding the extracted person (for example, a face image acquired from the moving image data) is outputted.

For example, a criminal who commit crimes, such as pickpocketing, molesting, and surreptitious shooting, frequently appears at the crime site for viewing a site in advance for a crime or linger unnaturally long in the place in order to search for a crime target. By providing the data processing apparatus of the present example embodiment with moving image data as data to be analyzed obtained by capturing the crime site or its surroundings, it is possible to extract a person having a high appearance frequency at the place.

As described above, according to the data processing apparatus of the present example embodiment, a person (person to be retrieved) satisfying a predetermined condition can be retrieved from the moving image data, even under the circumstances of not being able to provide the apparatus with the feature value of the person to be retrieved, since the person to be retrieved has not been identified.

Figure 2:
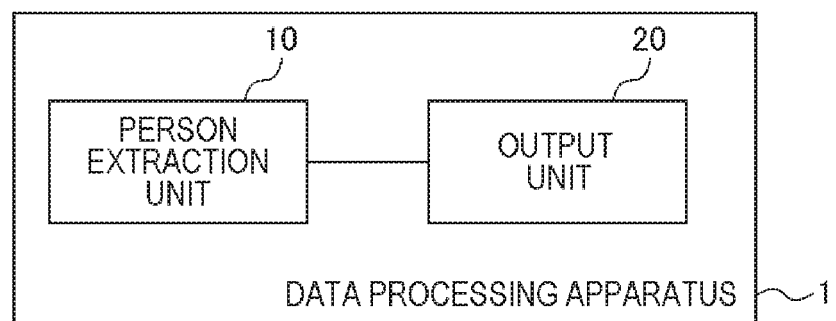
FIG. 2 is an example of a functional block diagram of a data processing apparatus of the present example embodiment.

Next, the configuration of the data processing apparatus of the present example embodiment will be described in detail. FIG. 2 shows an example of the functional block diagram of a data processing apparatus 1 of the present example embodiment. As shown in FIG. 2, the data processing apparatus 1 has a person extraction unit 10 and an output unit 20.

The person extraction unit 10 analyzes moving image data to be analyzed, and extracts a person whose appearance frequency in the moving image data satisfies a predetermined condition from persons detected in the moving image data.

Figure 3:
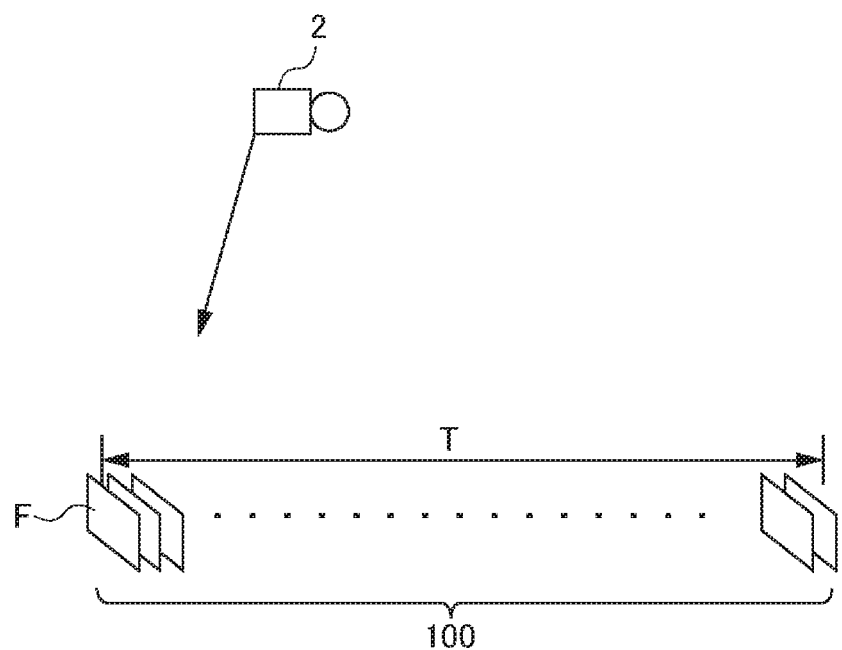
FIG. 3 is a schematic diagram for explaining moving image data to be analyzed according to the present example embodiment.

The moving image data to be analyzed in the present example embodiment is moving image data captured at the same place over a predetermined time period. For example, as shown in FIG. 3, moving image data captured by a security camera 2 installed at a predetermined place is inputted to the data processing apparatus 1 as moving image data 100 to be analyzed. The moving image data 100 includes a plurality of frames F over a predetermined time period T.

The person extraction unit 10 analyzes the moving image data 100 in units of time windows, each time window having a time width shorter than the predetermined time period T (for example, 30 seconds, one minute, 30 minutes, one hour, or one day). Then, determination is made on whether each person detected in the moving image data 100 appears in each of a plurality of the time windows. Hereinafter, an example of the determination processing will be described. However, the present invention is not limited thereto.

The person extraction unit 10 detects a person(s) from each frame. Then, the person extraction unit 10 groups the persons detected from the different frames such that those having outer appearance feature values (for example, face feature values) that are similar to each other by a predetermined level or more belong to the same group. As a result, in a case where the same person is detected from a plurality of frames, they can be grouped. Accordingly, it is possible to determine in which frame each person detected in the moving image data 100 appears.

Based on the relationship between each of the plurality of time windows and frames included in each time window, the person extraction unit 10 determines whether or not each person detected in the moving image data 100 appears in each of the plurality of time windows. In a case where a person detected in the moving image data 100 appears in at least one of a plurality of frames included in a first time window, the person is determined as appearing in the first time window.

As a result, a determination result shown in FIG. 4 is obtained. In the determination result shown in FIG. 4, the presence or absence of appearance of a person in each of the plurality of time windows is recorded in association with a person ID for identifying each person detected in the moving image data to be analyzed. A check flag indicates that the person has appeared in that time window.

Based on the result of the above determination, the person extraction unit 10 calculates an appearance frequency for each person (for each person ID) detected in the moving image data to be analyzed. As the appearance frequency, for example, the number of appearances (the number of time windows in which a person appears) or an appearance rate (=(the number of time windows in which a person appears)/ (the number of time windows in the moving image data 100 to be analyzed)) may be considered.

After calculating the appearance frequency, the person extraction unit 10 extracts a person (person ID) satisfying a predetermined condition based on the calculated appearance frequency. As the predetermined condition, any condition expressing a high appearance frequency may be adopted. For example, the predetermined condition may be "an appearance frequency of equal to or higher than a predetermined level". Specifically, "the number of times of appearances of equal to or higher than a predetermined number" and "an appearance rate of equal to or higher than a predetermined rate" may be used.

In addition, the predetermined condition may be "a predetermined number of persons in descending order of appearance frequency". Specifically, the predetermined condition may be "within a predetermined rank in the ranking in descending order of appearance frequency". The exemplified predetermined conditions are examples and the present invention is not limited thereto.

Returning to FIG. 2, the output unit 20 outputs information regarding a person extracted by the person extraction unit 10. The output unit is not particularly limited, and is implemented through any output apparatus, such as a display, a printer, and a mailer.

For example, the output unit 20 can output an image (for example, a face image) of each person acquired from the moving image data to be analyzed as information regarding the extracted person.

Figure 15:
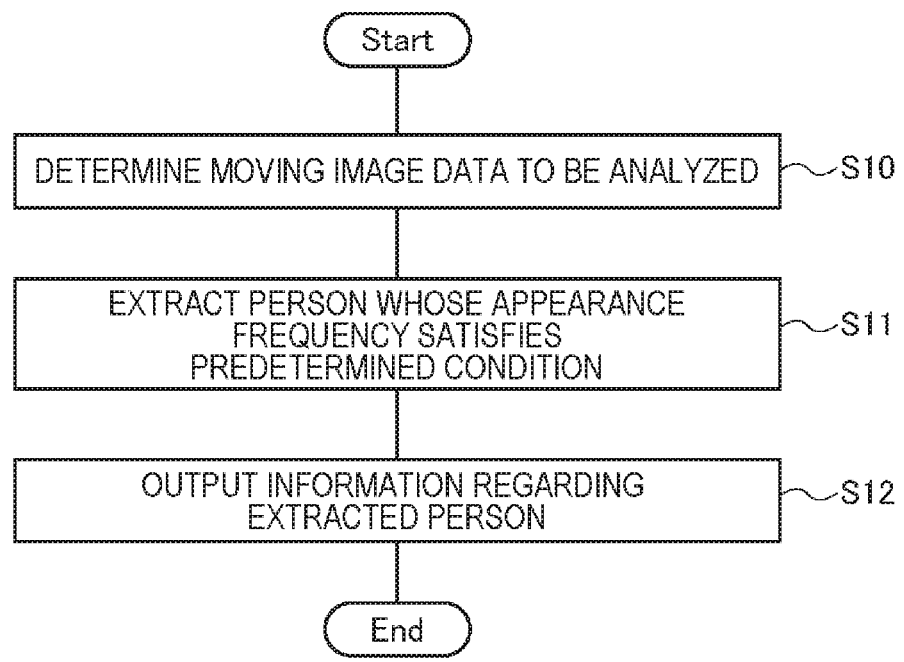
FIG. 15 is a flowchart showing an example of the processing flow of the data processing apparatus of the present example embodiment.

Next, an example of the processing flow of the data processing apparatus 1 will be described with reference to the flowchart shown in FIG. 15.

First, the data processing apparatus 1 determines the moving image data to be analyzed (S10). For example, the user specifies a predetermined moving image file to be analyzed. Then, the data processing apparatus 1 sets all pieces of moving image data of the moving image file as data to be analyzed. As another example, the user may specify the start position and the end position of the data to be analyzed in the predetermined moving image file. Then, the data processing apparatus 1 may set a range from the specified start position to the specified end position of the moving image file as data to be analyzed.

The person extraction unit 10 then analyzes the moving image data to be analyzed, and extracts a person whose appearance frequency in the moving image data satisfies a predetermined condition among persons detected in the moving image data (S11).

That is, the person extraction unit 10 analyzes the moving image data in units of predetermined time windows, and determines whether or not each person detected in the moving image data appears in each of a plurality of time windows. Then, based on the determination result, the person extraction unit 10 calculates an appearance frequency for each person detected in the moving image data. The person extraction unit 10 then extracts a person whose appearance frequency satisfies the predetermined condition among persons detected in the moving image data.

Thereafter, the output unit 20 outputs the information regarding the person extracted in S11 (S12). For example, the output unit 20 outputs a face image (acquired from the moving image data) of the person extracted in S11.

According to the present example embodiment described above, a person (person to be retrieved) satisfying a predetermined condition (high appearance frequency) can be retrieved from the moving image data under circumstances in which the feature value of the person to be retrieved cannot be provided to the apparatus, since the person to be retrieved has not been identified.

Although an example has been described in which the moving image data to be analyzed is "moving image data captured at the same place over a predetermined time period", the moving image data to be analyzed may also be "moving image data captured at a plurality of places over a predetermined time period". Also in this case, the same advantageous effect can be achieved by the same processing.

Here, an application example of the present example embodiment will be described. For example, moving image data captured by security cameras installed at places where many people gather and crimes such as pickpocketing, molesting, surreptitious shooting, and shoplifting frequently occur, such as train stations, sightseeing spots, shopping centers, convenience stores, and supermarkets, or places with possibility of such crimes is provided to the data processing apparatus 1 as data to be analyzed.

Then, the data processing apparatus 1 analyzes the moving image data to be analyzed, and extracts a person whose appearance frequency in the moving image data satisfies the predetermined condition (person with a high appearance frequency) among persons detected in the moving image data.

As a result, for example, a person lingering in the same place for viewing a site in advance for a crime (pickpocketing, molesting, surreptitious shooting, shoplifting, and the like) or frequently appearing at the same place, a person roaming about to find a crime target (a target of pickpocketing, molesting, surreptitious shooting, and the like), a person lingering at the same place to find a crime target (a target of pickpocketing, molesting, surreptitious shooting, and the like are to be committed), and a person lingering at the same place or roaming about waiting for a timing to commit a crime (pickpocketing, molesting, surreptitious shooting, shoplifting, and the like) are extracted.

As another application example, by providing the data processing apparatus 1 with moving image data captured by security cameras installed in large facilities, places where visitors frequently visit, and the like as data to be analyzed, it is possible to extract a person who is lost and walking around in a facility or a sightseeing area. For example, by providing guide staff or the like with the information of the extracted person, the guide staff may be able to contact the person.

In addition, by providing the data processing apparatus 1 with moving image data to be analyzed captured by a security camera installed in a shop, it is possible to extract customers frequently appearing in the shop. By providing a sales person with the information of such customers, the sales person can provide appropriate customer service to the customers. As a result, an effect such as increased sales may be expected.

Second Example Embodiment

In the present example embodiment, the processing of the person extraction unit 10 is further embodied. Other configurations are the same as those in the first example embodiment.

A functional block diagram of the data processing apparatus 1 of the present example embodiment is shown in FIG. 2. As shown in FIG. 2, the data processing apparatus 1 has a person extraction unit 10 and an output unit 20. The configuration of the output unit 20 is the same as that in the first example embodiment.

The person extraction unit 10 analyzes the moving image data 100 to be analyzed for each frame, and detects a person(s) from each frame. Since a unit that detects a person(s) from an image can be implemented according to the related art, explanation thereof will not be repeated herein. The person extraction unit 10 may analyze all frames as data to be processed and perform person detection, or may intermittently analyze frames as data to be processed (for example, every M frames, provided M is an integer of 1 or more).

The person extraction unit 10 assigns a detection ID to each person detected from each frame. In a case where the same person is detected from a plurality of frames, a detection ID is provided for each detection from each frame.

Then, as shown in FIG. 5, the person extraction unit 10 associates predetermined information with the detection ID. First, the person extraction unit 10 extracts an outer appearance feature (for example, a face feature) from the image of each person in each frame, and associates the extracted feature value with the detection ID. In addition, the person extraction unit 10 associates a frame ID, which indicates the frame the person was detected in, with the detection ID. The person extraction unit 10 may further generate a file of the face image of each person in each frame, and associate the file with the detection ID. The file of a face image is generated by cutting out a portion (a face portion of each person) from each frame.

Then, the person extraction unit 10 groups detection IDs obtained from different frames such that those having associated feature values that are similar to each other by a predetermined level or more belong to the same group. As a result, in a case where the same person is detected from a plurality of frames, the detection IDs of the plurality of detections can be grouped. The person extraction unit 10 then assigns a person ID to each group, the person ID identifying each "person detected in the moving image data to be analyzed". As a result, detected person information shown in FIG. 6 is generated. In the detected person information shown in the diagram, a person ID for identifying a "person detected in the moving image data to be analyzed" is associated with a detection ID.

After the detected person information shown in FIG. 6 is completed by processing all the frames to be processed, the person extraction unit 10 determines whether or not each person (person corresponding to each person ID) detected in the moving image data 100 to be analyzed appears in each of the plurality of time windows based on the information shown in FIGS. 5 and 6 and on the relationship between each of the plurality of time windows and the frames included in each time window. As a result, a determination result shown in FIG. 4 is obtained.

Then, the person extraction unit 10 calculates appearance frequencies as described in the first example embodiment, and extracts a person whose appearance frequency satisfies a predetermined condition.

Here, an example of the processing flow in which the person extraction unit 10 generates the detected person information shown in FIG. 6 will be described. This example is merely an example, and the present invention is not limited to those described herein.

The person extraction unit 10 analyzes one of a plurality of frames to be processed as a first frame to be processed. Then, when persons are detected from the frame, the person extraction unit 10 assigns detection IDs to all the detected persons. Then, as shown in FIG. 5, a feature value, a frame ID, a face image file ID, and the like are associated with each detection ID.

The person extraction unit 10 assigns a person ID in association with each of all the detected IDs, and registers the person IDs in the detected person information as shown in FIG. 6.

Thereafter, the person extraction unit 10 analyzes the next frame as a frame to be processed. Then, in a case where persons are detected from the frame to be processed, the person extraction unit 10 assigns detection IDs to all the detected persons. Then, as shown in FIG. 5, a feature value, a frame ID, a face image file ID, and the like are associated with each detection ID.

Thereafter, the person extraction unit 10 determines whether or not the outer appearance feature value of each person detected in the frame to be processed is similar by the predetermined level or more to that of any of persons detected in previously processed frames.

For example, the person extraction unit 10 creates a pair of the detection ID obtained from the frame to be processed and the detection ID obtained from the previously processed frame, and calculates a similarity between the feature values associated with the respective detection IDs for each pair. Then, the person extraction unit 10 determines whether the similarity is equal to or higher than the predetermined level.

In a case where a person whose similarity is equal to or higher than the predetermined level has not been detected in the previously processed frame, the person extraction unit 10 assigns a person ID in association with the detection ID of the person, and newly registers the person ID in the detected person information shown in FIG. 6.

On the other hand, in a case where a person whose similarity is equal to or higher than the predetermined level has been detected in the previously processed frame, the person extraction unit 10 registers the detection ID of the person in the detected person information shown in FIG. 6 so as to be associated with the same person ID as the detection ID determined to be similar.

Thereafter, the person extraction unit 10 performs similar processing for all frames to be detected.

Here, a "specific example of processing for determining whether or not the outer appearance feature value of each person detected from the frame to be processed is similar by the predetermined level or more to that of any of persons detected in previously processed frames" will be described.

For example, all possible pairs of all persons (all detection IDs) detected in previously processed frames and the detection ID of the person detected from the frame to be processed may be created, and similarity determination may be performed for each pair. In this case, however, the number of pairs would become enormous. As a result, the processing speed may be reduced.

Figure 7:
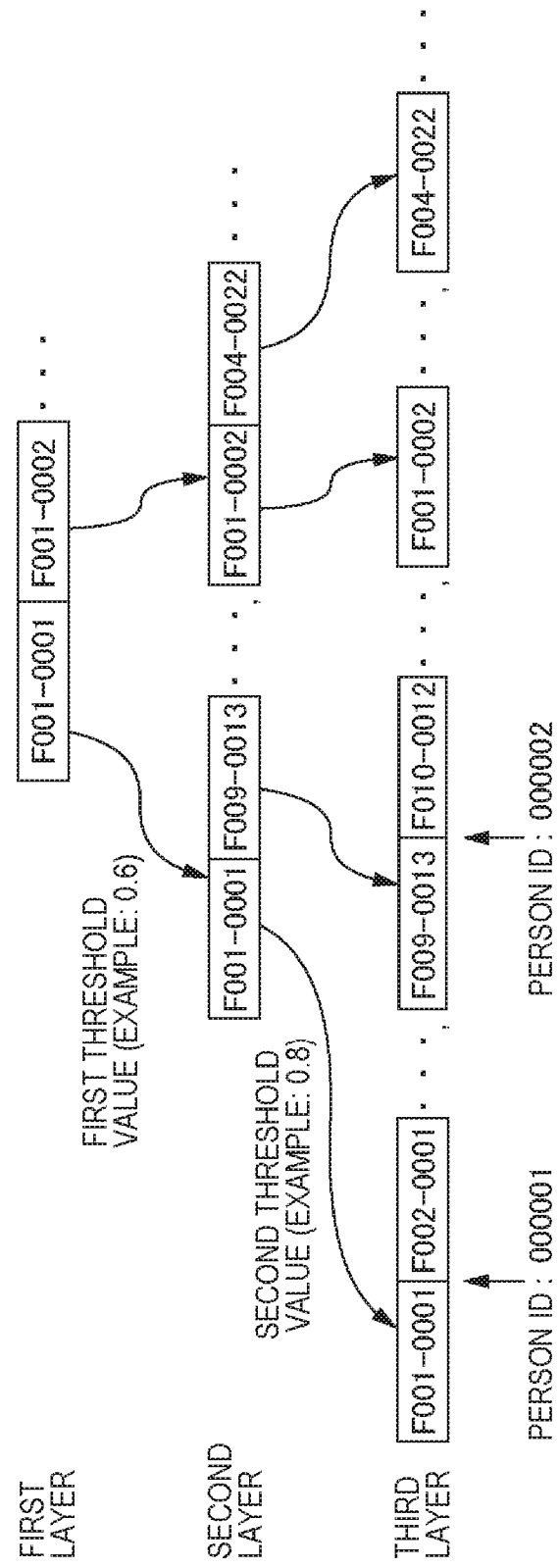
FIG. 7 is a schematic diagram for explaining indexes of the present example embodiment.

Therefore, for example, the person extraction unit 10 may index a person detected from each frame as shown in FIG. 7, and perform the above-described determination using the index. By using the index, it is possible to increase the processing speed. The details of the index and the generation method are disclosed in Patent Documents 2 and 3. Hereinafter, the structure of the index in FIG. 7 and its usage will be briefly described.

The indexes shown in FIG. 7 hierarchize persons detected from a plurality of frames, specifically, FIG. 7 hierarchizes detection IDs.

In the third layer, nodes corresponding to each of all the detection IDs obtained from all the frames processed up to that point are arranged. Then, the plurality of nodes arranged in the third layer are grouped such that those having a similarity (similarity between the feature values shown in FIG. 5) equal to or higher than a predetermined level are grouped together.

In the second layer, one node (representative) selected from the plurality of groups in the third layer is arranged and linked with the corresponding group of the third layer. The plurality of nodes arranged in the second layer are grouped such that those having a similarity (similarity between the feature values shown in FIG. 5) equal to or higher than a predetermined level are grouped together.

The criteria (second threshold value) for similarities for grouping in the third layer is higher than the criteria (first threshold value) of similarity for grouping in the second layer. The second threshold value serves as the "predetermined level" in the "processing for determining whether or not the outer appearance feature value of each person detected from the frame to be processed is similar by the predetermined level or more to that of any of persons detected in previously processed frames".

In the first layer, one node (representative) selected from the plurality of groups in the second layer is arranged and linked with the corresponding group of the second layer.

The detection ID of a person detected in a frame processed before the frame to be processed is indexed in this manner.

Next, using this index, the "processing for determining whether or not the outer appearance feature value of each person detected from the frame to be processed is similar by the predetermined level or more to that of any of persons detected in previously processed frames" will be described.

First, the person extraction unit 10 sets a plurality of detection IDs located in the first layer as detection IDs to be compared. The person extraction unit 10 creates a pair of the detection ID of a person detected from the frame to be processed and each of the plurality of detection IDs located in the first layer. Then, the person extraction unit 10 calculates a similarity for each pair, and determines whether the calculated similarity is equal to or higher than the first threshold value.

In a case where there is no detection ID whose similarity is equal to or higher than the first threshold value in the first layer, the person extraction unit 10 determines that the outer appearance feature value of the person detected from the frame to be processed is not similar by the predetermined level or more to that of any of persons detected in previously processed frames. Then, the person extraction unit 10 associates a new person ID with the detection ID of the person detected from the frame to be processed, and registers the new person ID in the detected person information shown in FIG. 6.

On the other hand, in a case where there is a detection ID whose similarity is equal to or higher than the first threshold value in the first layer, the person extraction unit 10 moves the comparison subject to the second layer. Specifically, the group in the second layer linked to the "detection ID of the first layer determined that the similarity is equal to or higher than the first threshold value" is set as a comparison subject.

Then, the person extraction unit 10 creates a pair of the detection ID of a person detected from the frame to be processed and each of the plurality of detection IDs included in the above group of the second layer. Then, the person extraction unit 10 calculates a similarity for each pair, and determines whether the calculated similarity is equal to or higher than the second threshold value. As described above, the second threshold value is higher than the first threshold value.

In a case where there is no detection ID whose similarity is equal to or higher than the second threshold value in the group of the second layer, the person extraction unit 10 determines that the outer appearance feature value of the person detected from the frame to be processed is not similar by the predetermined level or more to that of any of persons detected in previously processed frames. Then, the person extraction unit 10 associates a new person ID with the detection ID of the person detected from the frame to be processed, and registers the new person ID in the detected person information shown in FIG. 6.

On the other hand, in a case where there is a detection ID whose similarity is equal to or higher than the second threshold value in the group of the second layer, the person extraction unit 10 determines that a person whose outer appearance feature value is similar by the predetermined level or more to that of the person detected from the frame to be processed is present among persons detected in previously processed frames. Then, the person extraction unit 10 registers the detection ID of the person detected from the frame to be processed in the detected person information shown in FIG. 6 in association with the same person ID as the "detection ID of the second layer determined that the similarity is equal to or higher than the second threshold value".

The data processing apparatus 1 may have a unit that receives a user input for setting the first threshold value and the second threshold value. The person extraction unit 10 may execute the above-described processing based on the set value.

According to the present example embodiment described above, the same advantageous effect as in the first example embodiment can be achieved. In addition, according to the present example embodiment, it is possible to increase the speed of retrieval processing.

According to the present example embodiment in which the criteria for the similarity can be set, persons extracted from a plurality of frames can be grouped with high accuracy such that the same person belongs to the same group. In a case where the criteria are too low, a possibility that different persons will be erroneously determined as the same person increases. On the other hand, in a case where the criteria are too high, a possibility that the same person will be erroneously determined as different persons increases.

According to the present example embodiment, the user can adjust the criteria for similarity to a desired state while checking the determination result. As a result, persons extracted from a plurality of frames can be grouped with high accuracy such that the same person belongs to the same group.

Third Example Embodiment

A data processing apparatus 1 of the present example embodiment is different from those of the first and second example embodiments in that the user can set the time window described in the first example embodiment. Other configurations are the same as those in the first and second example embodiments.

Figure 8:
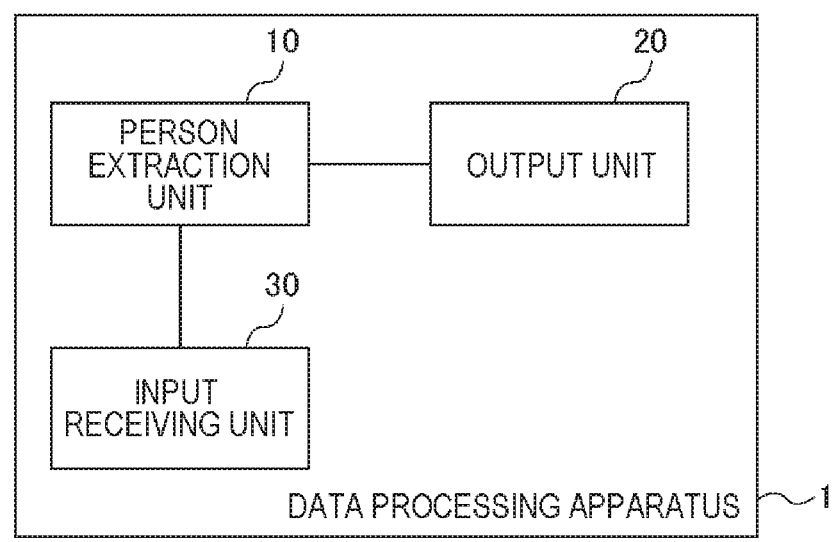
FIG. 8 is an example of a functional block diagram of a data processing apparatus of the present example embodiment.

FIG. 8 shows an example of the functional block diagram of the data processing apparatus 1 of the present example embodiment. As shown in FIG. 8, the data processing apparatus 1 has a person extraction unit 10, an output unit 20, and an input receiving unit 30. The configuration of the output unit 20 is the same as that in the first and second example embodiments.

The input receiving unit 30 receives an input for setting the time window from the user. For example, the input receiving unit 30 may receive a user input for setting the time width of the time window (for example, 30 seconds, one minute, 30 minutes, one hour, or one day).

In addition, the input receiving unit 30 may receive a user input for individually setting the start position and the end position of each of the plurality of time windows.

The person extraction unit 10 analyzes the moving image data to be analyzed in units of the set time window. Then, the person extraction unit 10 determines whether or not each person detected in the moving image data to be analyzed appears in each of the plurality of time windows, and calculates the appearance frequency based on the determination result. Other configurations of the person extraction unit 10 are the same as those in the first and second example embodiments.

According to the present example embodiment described above, the same advantageous effect as in the first and second example embodiments can be achieved.

According to the present example embodiment in which the user can set the time window, the user can obtain a desired output result by setting the time window to a desired state.

For example, by setting the time width of the time window to a desired state, it is possible to obtain the extraction result of a person frequently appearing at desired time intervals. For example, by setting the time width of the time window to one hour, it is possible to obtain the extraction result of a person having a high appearance frequency for each one-hour period. In addition, by setting the time width of the time window to 1 day, it is possible to obtain the extraction result of a person having a high appearance frequency every day.

In addition, by individually setting the start position and the end position of each of the plurality of time windows, it is possible to obtain the extraction result of a person frequently appearing at a desired timing. For example, by setting a plurality of time windows so as to include each of a plurality of timings at which a crime, such as pickpocketing, molesting, and surreptitious shooting, has occurred, it is possible to obtain the extraction result of a person frequently appearing at the timing of the crime.

Here, an application example of the present example embodiment will be described. For example, in a case where similar crimes (pickpocketing, molesting, surreptitious shooting, shoplifting, or the like) have frequently occurred at a certain place, moving image data captured by a security camera installed at the place is provided to the data processing apparatus 1 as data to be processed.

Then, the operator sets the start position and the end position of each of the plurality of time windows so as to include the occurrence time of each of the plurality of crimes. As a result, a person having a high appearance frequency at a plurality of crime occurrence times (a person who is frequently present at the crime site during a plurality of crime occurrence times) is extracted.

Fourth Example Embodiment

A data processing apparatus 1 of the present example embodiment is different from those of the first to third example embodiments in terms of the configuration of the output unit 20. Other configurations are the same as those in the first to third example embodiments.

An example of the functional block diagram of the data processing apparatus 1 of the present example embodiment is shown in FIG. 2 or FIG. 8. That is, the data processing apparatus 1 has a person extraction unit 10 and an output unit 20. The data processing apparatus 1 may further have an input receiving unit 30. The configurations of the person extraction unit 10 and the input receiving unit 30 are the same as those in the first to third example embodiments.

The output unit 20 outputs information regarding a person extracted by the person extraction unit 10. As described in the first example embodiment, the output unit 20 can output a face image of the person extracted by the person extraction unit 10.

Figure 9:
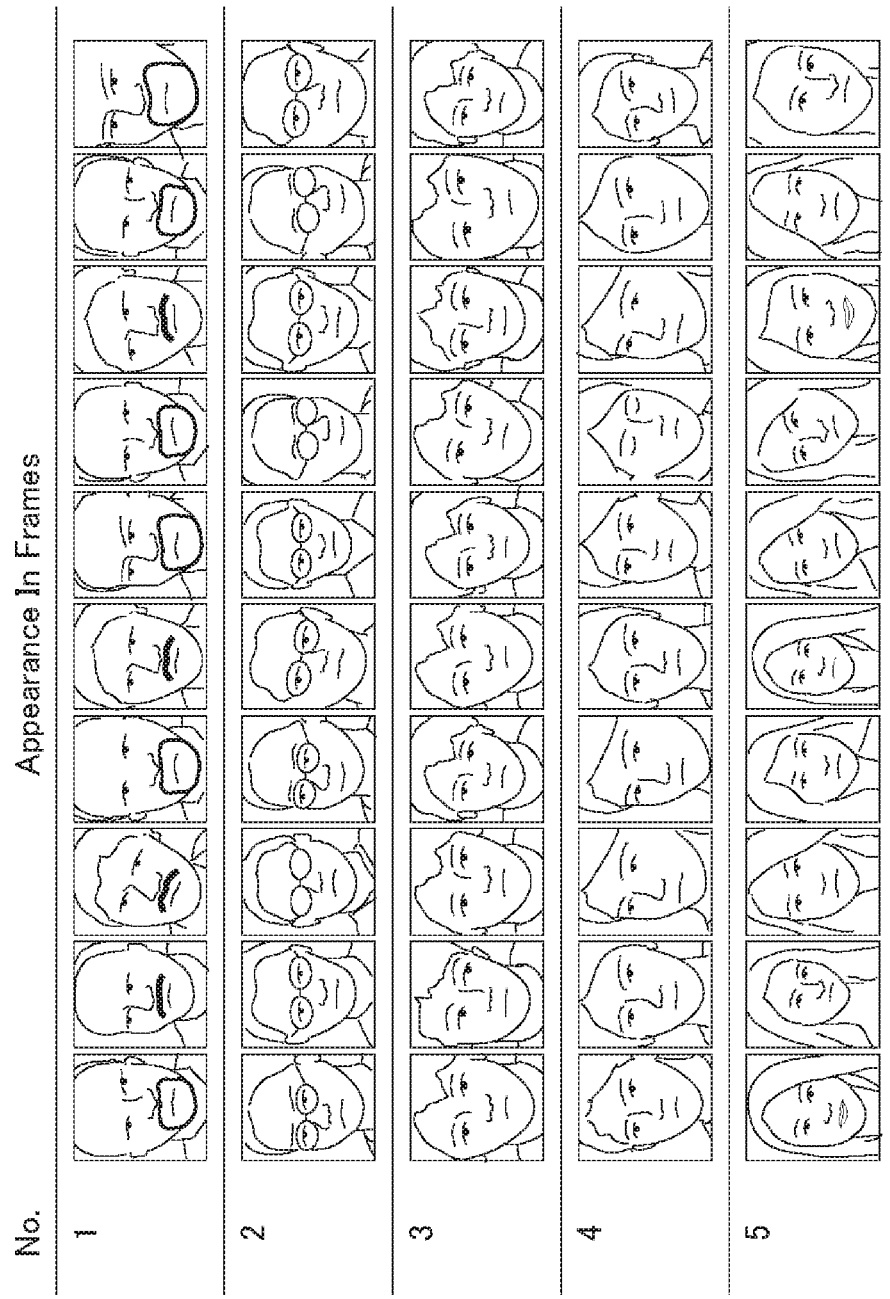
FIG. 9 is an example of output information from an output unit of the present example embodiment.

In addition, the output unit 20 may output a screen shown in FIG. 9. On the illustrated screen, a plurality of persons extracted by the person extraction unit 10 are displayed as a list so as to be aligned in the vertical direction in descending order of appearance frequency. In addition, a plurality of face images acquired from a plurality of different frames are displayed as a list so as to be aligned in the horizontal direction in association with each of the plurality of persons extracted by the person extraction unit 10. In a case where face images are acquired from frames exceeding the number that can be listed in the horizontal direction, a predetermined number of face images may be randomly extracted from the frames and displayed as a list as shown in FIG. 9.

Although not shown, the output unit 20 may further output the appearance frequency in the moving image data to be analyzed in association with each of the plurality of persons extracted by the person extraction unit 10.

Figure 10:
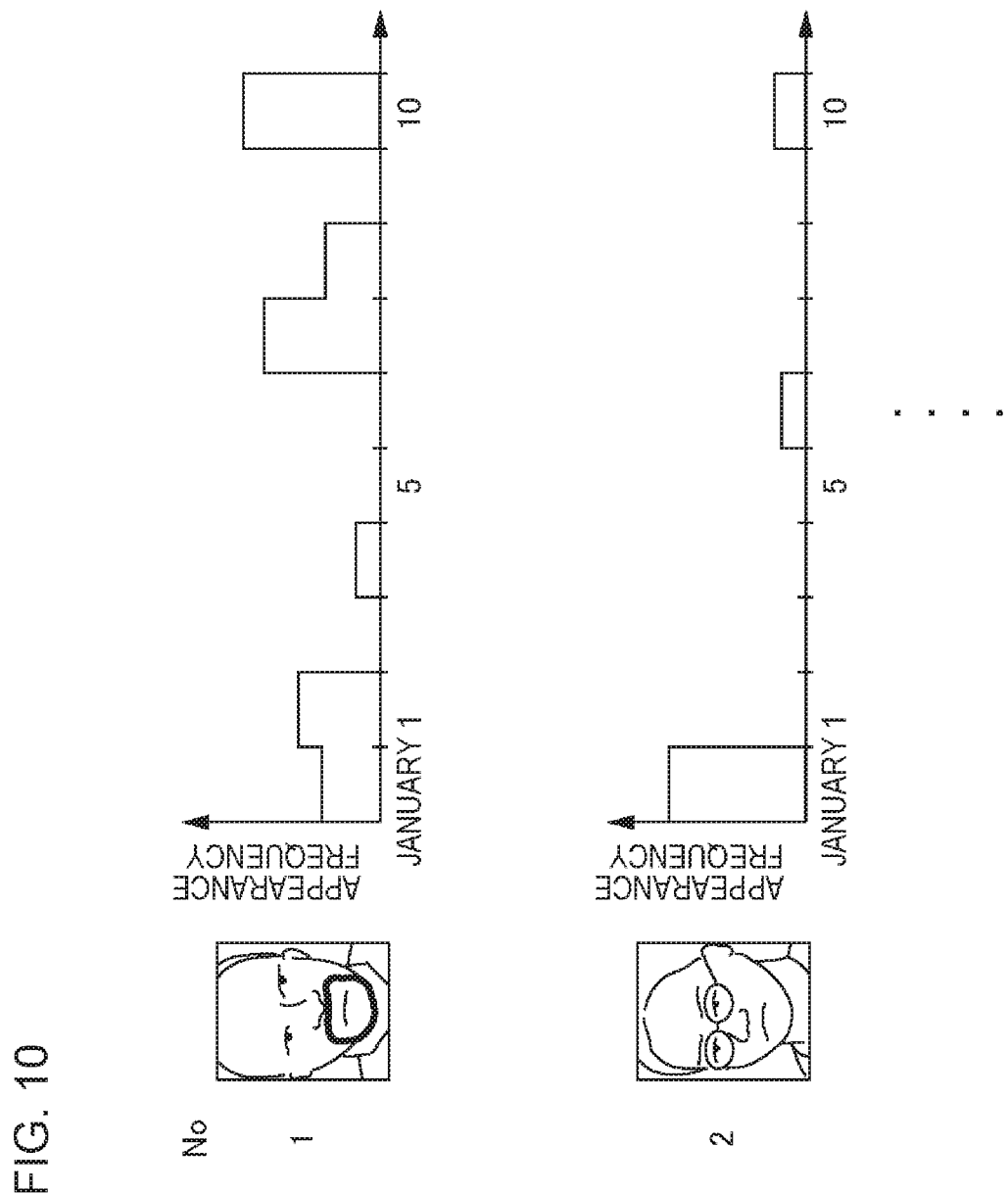
FIG. 10 is an example of output information from the output unit of the present example embodiment.

As shown in FIG. 10, the output unit 20 may output information indicating a temporal change in appearance frequency in association with each of the plurality of persons extracted by the person extraction unit 10. In the example shown in FIG. 10, face images of the plurality of persons extracted by the person extraction unit 10 and graphs showing temporal changes in appearance frequency are displayed as a list so as to be aligned in the vertical direction in descending order of appearance frequency.

In the graph showing a temporal change in appearance frequency, the horizontal axis indicates time, and the vertical axis indicates appearance frequency (the number of appearances). The graph shows a temporal change in the number of appearances (0 to 24) per day with the time width of the time window being one hour. The scale interval on the horizontal axis in the graph may be set by the user. As described above, the temporal change of the time window may be set by the user.

As shown in FIG. 11, the output unit 20 may output information showing a face image of the person and the presence or absence of appearance in each of the plurality of time windows in association with each of the plurality of persons extracted by the person extraction unit 10. In the illustrated example, the time width of the time window is one day. When the time width of the time window is one hour, the presence or absence of appearance in each time window for each hour will be shown, such as "May 4th, 0-1 o'clock" and "May 4th, 1-2 o'clock".

According to the present example embodiment described above, the same advantageous effect as in the first to third example embodiments can be achieved. In addition, according to the present example embodiment, extraction results can be provided to the user in various display forms.

For example, by outputting the face image of a person extracted by the person extraction unit 10, the user can recognize the face of a person having a high appearance frequency.

In addition, by displaying a list of a plurality of persons extracted by the person extraction unit 10 so as to be aligned in descending order of appearance frequency as shown in FIG. 9, it is possible to view a plurality of persons having high appearance frequencies together and to easily recognize the ranking easily.

By displaying a list of a plurality of face images acquired from a plurality of different frames in association with each of the plurality of persons extracted by the person extraction unit as shown in FIG. 9, it is possible to recognize the movement of the person. For example, it is possible to recognize whether the person lingering in the same place or is moving within a certain range, based on differences in the background, differences in the directions of the face, differences in brightness, and the like.

By checking whether or not face images of different persons are included in a plurality of face images acquired from a plurality of frames, it is possible to check the accuracy of the processing for grouping persons extracted from the plurality of frames such that the same person belongs to the same group. As described in the second example embodiment, in a case where the data processing apparatus 1 includes a "unit by which the user can set the criteria for similarity", the user can adjust the criteria for similarity while checking the display shown in FIG. 9. As a result, persons extracted from a plurality of frames can be grouped with high accuracy such that the same person belongs to the same group.

By outputting the appearance frequency in the moving image data to be analyzed in association with each of the plurality of persons extracted by the person extraction unit 10, it is possible to easily recognize the appearance frequency of each person. Based on such information, it is possible to narrow down the persons to be retrieved.

By outputting information indicating the temporal change in appearance frequency in association with each of the plurality of persons extracted by the person extraction unit 10 as shown in FIG. 10, it is possible to recognize the appearance pattern of each person. Based on such information, it is possible to narrow down the persons to be retrieved. By appropriately setting the time width of the time window or the scale interval on the horizontal axis in the shown graph, it is possible to obtain desired information.

By showing the face image of the person and the presence or absence of appearance in each of the plurality of time windows in association with each of the plurality of persons extracted by the person extraction unit 10 as shown in FIG. 11, it is possible to easily recognize the presence or absence of appearance in each time window.

Fifth Example Embodiment

First, the outline of the present example embodiment will be described. In a data processing apparatus of the present example embodiment, moving image data to be analyzed are moving image data captured over a predetermined time period at a plurality of places different from each other. Then, the data processing apparatus analyzes the moving image data to be analyzed, and extracts a person whose appearance frequency (for example, the number of appearances or an appearance rate) in the moving image data satisfies a predetermined condition (for example, higher than a predetermined level) from persons detected in the moving image data. Then, information regarding the extracted person is outputted (for example, a face image acquired from moving image data).

For example, in a case where highly relevant crimes occur at a plurality of places, by providing the data processing apparatus of the present example embodiment with a plurality of pieces of moving image data (moving image files) obtained by capturing each of a plurality of crime sites or their surroundings as data to be analyzed, it is possible to extract a person having a high appearance frequency at the plurality of crime sites.

As described above, according to the data processing apparatus of the present example embodiment, a person (person to be retrieved) satisfying a predetermined condition can be retrieved from the moving image data under circumstances in which the feature value of the person to be retrieved cannot be provided to the apparatus, since the person to be retrieved has not been identified.

Next, the configuration of the data processing apparatus of the present example embodiment will be described in detail. A functional block diagram of the data processing apparatus 1 of the present example embodiment is shown in FIG. 2. As shown in FIG. 2, the data processing apparatus 1 has a person extraction unit 10 and an output unit 20.

The person extraction unit 10 analyzes moving image data to be analyzed, and extracts a person whose appearance frequency in the moving image data to be analyzed satisfies a predetermined condition among persons detected in the analyzed moving image data.

Figure 12:
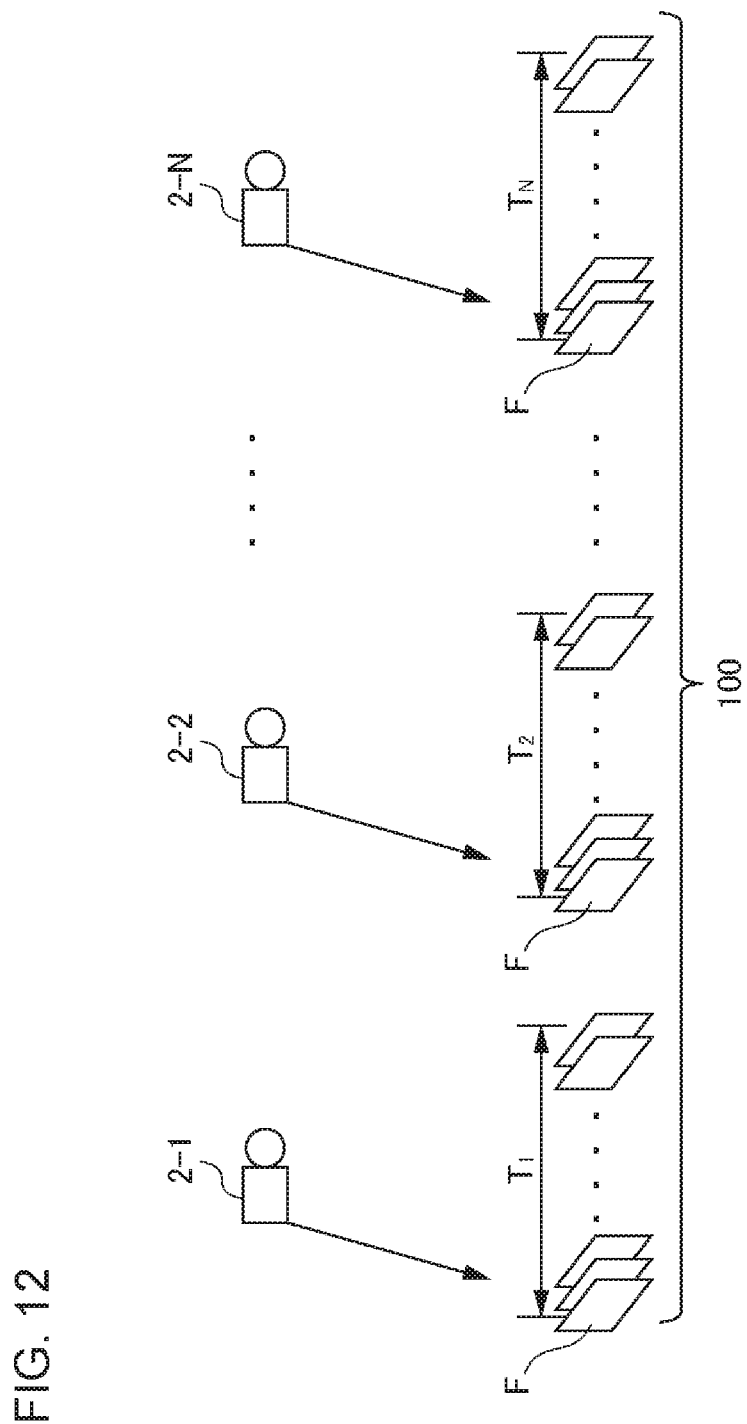
FIG. 12 is a schematic diagram for explaining moving image data to be analyzed according to the present example embodiment.

The moving image data to be analyzed of the present example embodiment is moving image data captured over a predetermined time period at a plurality of places different from each other. For example, as shown in FIG. 12, pieces of child data (moving image data) captured by each of security cameras 2-1 to 2-N installed at a plurality of places different from each other are inputted to the data processing apparatus 1 as moving image data 100 to be analyzed. The child data (moving image data) captured by each of the security cameras 2-1 to 2-N includes a plurality of frames F captured over a predetermined time period $T_1$ to $T_N$.

The person extraction unit 10 determines whether or not each person detected in the moving image data to be analyzed appears in each of a plurality of pieces of child data, and calculates the appearance frequency based on the determination result. Hereinafter, an example of the determination processing will be described.

The person extraction unit 10 analyzes the moving image data to be analyzed, which includes the plurality of pieces of child data, for each frame, and detects persons from each frame. Then, the person extraction unit 10 groups the persons detected from the different frames such that those having outer appearance feature values (for example, face feature values) that are similar to each other by a predetermined level or more belong to the same group. As a result, in a case where the same person is detected from a plurality of frames, these can be grouped. As a result, it is possible to determine in which frame each person detected in the detected moving image data 100 to be analyzed appears.

Then, based on the relationship between each of the plurality of pieces of child data and the frames included in each piece of child data, the person extraction unit 10 determines whether or not each person detected in the moving image data 100 to be analyzed appears in each of the plurality of pieces of child data. A person is determined as appearing in first child data if the person appears in at least one of the plurality of frames included in the first child data.

As a result, a determination result shown in FIG. 13 is obtained. In the determination result shown in FIG. 13, presence or absence of appearance in each of the plurality of pieces of child data is recorded in association with a person ID for identifying each person detected in the moving image data to be analyzed. A case where the check flag is set indicates that the person has appeared.

Based on the result of the above determination, the person extraction unit 10 calculates an appearance frequency for each person (for each person ID) detected in the moving image data to be analyzed. As the appearance frequency, for example, the number of appearances (the number of pieces of child data in which a person appears) or an appearance rate (=(the number of pieces of child data in which a person appears)/(the number of pieces of child data in the moving image data 100 to be analyzed)) can be considered.

After calculating the appearance frequency, the person extraction unit 10 extracts a person (person ID) satisfying a predetermined condition based on the calculated appearance frequency. As the predetermined condition, any condition expressing a high appearance frequency may be adopted. For example, the predetermined condition may be "an appearance frequency of equal to or higher than a predetermined level". Specifically, "the number of appearances of equal to or higher than a predetermined number of times" and "the appearance rate of equal to or higher than a predetermined rate" may be used.

In addition, the predetermined condition may be "a predetermined number of persons in descending order of appearance frequency". Specifically, the predetermined condition may be "within a predetermined rank in the ranking in descending order of appearance frequency". The predetermined conditions exemplified herein are examples and the present invention is not limited thereto.

Returning to FIG. 2, the output unit 20 outputs information regarding the person extracted by the person extraction unit 10. The output unit is not particularly limited, and is implemented through all output apparatuses, such as a display, a printer, and a mailer. An example of the output of the output unit 20 is the same as that in the first to fourth example embodiments.

The output unit 20 may output information indicating at least one of: the place where each of the plurality of persons extracted by the person extraction unit 10 appeared; and the number of places where the person appeared. For example, as shown in FIG. 14, a face image of the person and the person's presence or absence of appearance in each of the plurality of pieces of child data may be shown in association with each of the plurality of persons extracted by the person extraction unit 10. In the illustrated example, as information for identifying each piece of child data, information for identifying the place where each piece of child data was captured is displayed.

It should be noted that the person extraction unit 10 of the present example embodiment may execute processing according to the configuration of the person extraction unit 10 of the second example embodiment.

Next, an example of the processing flow of the data processing apparatus 1 will be described with reference to the flowchart shown in FIG. 15.

First, the data processing apparatus 1 determines the moving image data to be analyzed (S10). For example, the user specifies a plurality of moving image files captured at a plurality of places different from each other as data to be analyzed. Then, the data processing apparatus 1 sets all the moving image files as data to be analyzed. In this case, each of the moving image files is handled as child data.

As another example, the user may specify a plurality of moving image files, and specify the start position and the end position of the data to be analyzed for each moving image file. Then, the data processing apparatus 1 may set a range from the specified start position to the specified end position of each moving image file as data to be analyzed. In this case, the data from the specified start position to the specified end position of each moving image file is handled as child data.

Then, the person extraction unit 10 analyzes the moving image data to be analyzed, and extracts a person whose appearance frequency in the moving image data to be analyzed satisfies a predetermined condition among persons detected in the moving image data to be analyzed (S11).

That is, the person extraction unit 10 determines whether or not each person detected in the moving image data to be analyzed appears in each of the plurality of pieces of child data. Then, based on the determination result, the person extraction unit 10 calculates an appearance frequency for each person detected in the moving image data to be analyzed. Then, the person extraction unit 10 extracts a person whose appearance frequency satisfies a predetermined condition among persons detected in the moving image data to be analyzed.

Thereafter, the output unit 20 outputs information regarding the person extracted in S11 (S12). For example, the output unit 20 outputs a face image (acquired from the moving image data to be analyzed) of the person extracted in S11.

According to the present example embodiment described above, a person (person to be retrieved) satisfying a predetermined condition (high appearance frequency) can be retrieved from the moving image data under circumstances in which the feature value of the person to be retrieved cannot be provided to the apparatus, since the person to be retrieved has not been identified.

Here, an application example of the present example embodiment will be described. For example, in a case where crimes (arson, pickpocketing, molesting, surreptitious shooting, shoplifting, or the like) conducted in a similar manner are frequently occurring at a plurality of places, moving image data captured by a security camera installed at each of the plurality of crime sites are provided to the data processing apparatus 1 as data to be analyzed.

As a result, a person having a high appearance frequency at the plurality of crime sites (a person having a high rate of presence at a plurality of crime sites) is extracted.

Sixth Example Embodiment

First, the outline of the present example embodiment will be described. A data processing apparatus 1 of the present example embodiment analyzes text data. The data processing apparatus 1 detects multiple word strings from the text data. A word string is a group composed of multiple words. For example, a word string may be multiple words in one sentence, multiple words in one paragraph, multiple words in one chapter, multiple words in one article, and multiple words on one page. In addition, multiple words from other groups may also be set as one word string.

After detecting multiple word strings, the data processing apparatus 1 groups the word strings having similarities equal to or higher than a predetermined level. In this manner, the word strings relevant to similar topics can be grouped.

Thereafter, the data processing apparatus 1 extracts a group of word strings whose appearance frequency in the text data to be analyzed is equal to or higher than a predetermined level among multiple groups of word strings, and outputs information regarding the extracted group of word strings.

Figure 16:
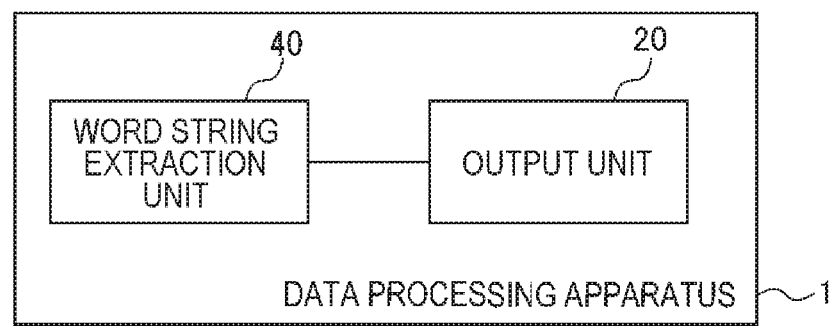
FIG. 16 is an example of a functional block diagram of a data processing apparatus of the present example embodiment.

Next, the configuration of the data processing apparatus 1 of the present example embodiment will be described in detail. A functional block diagram of the data processing apparatus 1 of the present example embodiment is shown in FIG. 16. As shown in FIG. 16, the data processing apparatus 1 has a word string extraction unit (extraction unit) 40 and an output unit 20.

The word string extraction unit 40 analyzes the text data to be analyzed, and extracts a word string whose appearance frequency in the text data to be analyzed satisfies a predetermined condition among word strings detected in the text data to be analyzed.

First, the text data to be analyzed is inputted to the word string extraction unit 40. The text data to be analyzed may be, for example, text data provided by a server on the Internet. Text data acquired from one or more servers may be inputted to the word string extraction unit as data to be analyzed.

The type of the server is not limited. For example, a social media server may be used. In this case, text data that has been uploaded by multiple users and is not restricted to be disclosed is inputted to the word string extraction unit 40 as text data to be analyzed.

In addition, the server may be an information providing server that provides the latest news and the like. In this case, text data, such as news published as a web page, is input to the word string extraction unit 40 as text data to be analyzed.

For example, data over several hours, several days, several weeks, several months, and several years may be inputted to the word string extraction unit 40 as data to be analyzed.

The text data to be analyzed does not need to be data on the Internet. For example, text data created by the user and stored locally may be inputted to the word string extraction unit 40 as data to be analyzed.

In a case where the text data to be analyzed is inputted, the word string extraction unit 40 analyzes the text data and detects multiple word strings in the text data to be analyzed.

As described above, a word string is a group of multiple words. For example, a word string may be multiple words in one sentence, multiple words in one paragraph, multiple words in one chapter, multiple words in one article, and multiple words on one page. Multiple words from other groups may also be a word string. The definition applies to each "word string" appearing below.

After detecting multiple word strings, the word string extraction unit 40 groups word strings having similarities equal to or higher than a predetermined level. In this manner, word strings relevant to similar topics can be grouped. Similarities between word strings may be calculated according to the related art.

Then, the word string extraction unit 40 calculates an appearance frequency for each group of word strings. The appearance frequency is calculated as, for example, the number of appearances (for example, the number of constituent members (word strings) of each group).

Thereafter, the word string extraction unit 40 extracts a group of word strings whose appearance frequency satisfies a predetermined condition (for example, appearance frequency of a predetermined level or higher). As a result, topics with high appearance frequency and high degree of attention are extracted.

The output unit 20 outputs information regarding the extracted group of word strings. The output unit 20 outputs information by which the details of each extracted group can be recognized. For example, the output unit 20 may output some of multiple word strings belonging to each extracted group. In addition, the output unit 20 may output words commonly appearing in multiple word strings belonging to each extracted group.

In addition to the information described above, the output unit 20 may output the calculated appearance frequency. In a case where attribute information (for example, upload date and time, data creation date and time) is associated with the text data inputted to the word string extraction unit 40, the output unit 20 may perform the output using the attribute information. For example, for each extracted group, the output unit 20 may count the appearance timings (for example, upload date and time, data creation date and time) of multiple word strings belonging to each group. Then, the output unit 20 may create and output a graph showing a temporal change in appearance frequency. Information indicating the presence or absence of appearance for each predetermined time zone may be created and outputted. As a result, it is possible to output extraction result in the same manner of display as in FIG. 10 or FIG. 11.

According to the present example embodiment described above, it is possible to retrieve a word string satisfying a predetermined condition from text data. For example, in a case where a plurality of pieces of text data created by a plurality of users are provided to the data processing apparatus 1 as data to be analyzed, it is possible to extract word strings relevant to topics with high appearance frequency among the text data of the plurality of users. As a result, the user who sees the extraction result can recognize topics with a high degree of attention.

It should be noted that, also in the present example embodiment, the technique described in the second example embodiment can be used.

In the first to sixth example embodiments, the examples in which the moving image data and the text data are data to be analyzed have been described. However, even in the case of analyzing other data, such as voice data, music data, image data, figure data, fingerprint data, biometric information, time series data (stock price fluctuation time series data and the like), file archive, object file, and binary data, the same effect can be obtained by similar processing.

That is, by subjecting the above pieces of data to (1) processing for detecting predetermined subjects, (2) processing for grouping the detected subjects based on the similarity between the detected subjects (similarity between the feature values), (3) processing for calculating the appearance frequency of each subject based on the grouping result, and (4) processing for extracting a subject whose appearance frequency satisfies a predetermined condition, it is possible to extract a desired subject (a subject whose appearance frequency satisfies a predetermined condition).

Hereinafter, examples of reference embodiments are additionally described.

1. A data processing apparatus including:
an extraction unit that analyzes data to be analyzed and extracts a subject whose appearance frequency in the data to be analyzed satisfies a predetermined condition among subjects detected in the data to be analyzed; and
an output unit that outputs information regarding the extracted subject.

2. The data processing apparatus described in 1,
in which the extraction unit includes a person extraction unit that analyzes moving image data to be analyzed and extracts a person whose appearance frequency in the moving image data to be analyzed satisfies a predetermined condition among persons detected in the moving image data to be analyzed, and
the output unit outputs information regarding the extracted person.

3. The data processing apparatus described in 2,
in which the moving image data to be analyzed includes a plurality of pieces of child data captured at a plurality of places different from each other, and
the person extraction unit determines whether or not each person detected in the moving image data to be analyzed appears in each of the plurality of pieces of child data, and based on a result of the determination, calculates an appearance frequency for each person detected in the moving image data.

4. The data processing apparatus described in 2,
in which the moving image data to be analyzed includes moving image data captured at the same place over a predetermined time period, and
the person extraction unit analyzes the moving image data to be analyzed in units of time windows, each time window having a time width smaller than the predetermined time period, determines whether or not each person detected in the moving image data to be analyzed appears in each of a plurality of the time windows, and calculates an appearance frequency for each detected person based on a result of the determination.

5. The data processing apparatus described in 4, further including an input receiving unit that receives a user input to set a time width of the time window.

6. The data processing apparatus described in 4, further including an input receiving unit that receives a user input to individually set a start position and an end position of each of a plurality of the time windows.

7. The data processing apparatus described in any one of 2 to 6, in which the person extraction unit extracts a predetermined number of persons in descending order of appearance frequency.

8. The data processing apparatus described in any one of 2 to 6, in which the person extraction unit extracts a person whose appearance frequency is equal to or higher than a predetermined level.

9. The data processing apparatus described in any one of 2 to 8, in which the output unit outputs an image of the person acquired from the moving image data to be analyzed as information regarding the extracted person.

10. The data processing apparatus described in 9, in which the output unit displays a list of a plurality of images of the person acquired from a plurality of different frames as information regarding the extracted person.

11. The data processing apparatus described in 9 or 10, in which the output unit outputs an appearance frequency of the extracted person in the moving image data to be analyzed as information regarding the extracted person.

12. The data processing apparatus described in any one of 9 to 11, in which the output unit displays information regarding each of a plurality of extracted persons as a list in descending order of appearance frequency.

13. The data processing apparatus described in any one of 9 to 12,
in which the moving image data to be analyzed includes moving image data captured at the same place over a predetermined time period, and
the output unit outputs information indicating a temporal change in appearance frequency as information regarding the extracted person.

14. The data processing apparatus described in any one of 9 to 12,
in which the moving image data to be analyzed includes a plurality of pieces of child data captured at a plurality of places different from each other, and
the output unit outputs information indicating at least one of a place where the person has appeared and the number of places where the person has appeared as information regarding the extracted person.

15. The data processing apparatus described in any one of 2 to 14,
in which the person extraction unit executes processing for determining whether a person detected in a frame to be processed is similar to a person detected in a previously processed frame in an outer appearance feature value by a predetermined level or more, and
the data processing extraction unit further includes a unit that receives a user input to set the predetermined level in the processing.

16. The data processing apparatus described in 1, in which the extraction unit includes a word string extraction unit that analyzes text data to be analyzed and extracts a word string whose appearance frequency in the text data to be analyzed satisfies a predetermined condition among word strings detected in the text data to be analyzed, and
the output unit outputs information regarding the extracted word string.

17. A data processing method causing a computer to execute:
an extraction step of analyzing data to be analyzed and extracting a subject whose appearance frequency in the data to be analyzed satisfies a predetermined condition among subjects detected in the data to be analyzed; and
an output step of outputting information regarding the extracted subject.

17-2. The data processing method described in 17,
in which the extraction step includes a person extraction step of analyzing moving image data to be analyzed and extracting a person whose appearance frequency in the moving image data to be analyzed satisfies a predetermined condition among persons detected in the moving image data to be analyzed, and
the output step includes outputting information regarding the extracted person.

17-3. The data processing method described in 17-2,
in which the moving image data to be analyzed includes a plurality of pieces of child data captured at a plurality of places different from each other, and
the person extraction step includes determining whether or not each person detected in the analyzed moving image data appears in each of the plurality of pieces of child data, and calculating an appearance frequency of each person detected in the analyzed moving image data based on a result of the determination.

17-4. The data processing method described in 17-2, in which the moving image data to be analyzed includes moving image data captured at the same place over a predetermined time period, and the person extraction step includes analyzing the moving image data in units of time windows, each time window having a time width smaller than the predetermined time period, determining whether or not each person detected in the analyzed moving image data appears in each of a plurality of the time windows, and calculating an appearance frequency of each person based on a determination result.

17-5. The data processing method described in 17-4, further causing the computer to execute an input receiving step of receiving a user input to set a time width of the time window.

17-6. The data processing method described in 17-4, further causing the computer to execute an input receiving step of receiving a user input to individually set a start position and an end position of each of a plurality of the time windows.

17-7. The data processing method described in any one of 17-2 to 17-6, in which the person extraction step includes extracting a predetermined number of persons in descending order of appearance frequency.

17-8. The data processing method described in any one of 17-2 to 17-6, in which the person extraction step includes extracting a person whose appearance frequency is equal to or higher than a predetermined level.

17-9. The data processing method described in any one of 17-2 to 17-8, in which the output step includes outputting an image of the person acquired from the moving image data to be analyzed as information regarding the extracted person.

17-10. The data processing method described in 17-9, in which the output step includes displaying a list of a plurality of images of the person acquired from a plurality of different frames as information regarding the extracted person.

17-11. The data processing method described in 17-9 or 17-10, in which the output step includes outputting an appearance frequency in the moving image data to be analyzed as information regarding the extracted person in the output step.

17-12. The data processing method described in any one of 17-9 to 17-11, in which the output step includes displaying information regarding each of a plurality of extracted persons as a list in descending order of appearance frequency.

17-13. The data processing method described in any one of 17-9 to 17-12, in which the moving image data to be analyzed includes moving image data captured at the same place over a predetermined time period, and the output step includes outputting information indicating a temporal change in appearance frequency as information regarding the extracted person.

17-14. The data processing method described in any one of 17-9 to 17-12, in which the moving image data to be analyzed includes a plurality of pieces of child data captured at a plurality of places different from each other, and the output step includes outputting information indicating at least one of a place where the person has appeared and the number of places where the person has appeared as information regarding the extracted person.

17-15. The data processing method described in any one of 17-2 to 17-14, in which the person extraction step includes executing processing to determine whether a person detected in a frame to be processed is similar to a person detected in a previously processed frame in outer appearance feature values, and the computer further executes a step of receiving a user input to set the predetermined level in the processing.

17-16. The data processing method described in 17, in which the extraction step includes a word string extraction unit that analyzes text data to be analyzed and extracts a word string whose appearance frequency in the text data to be analyzed satisfies a predetermined condition among word strings detected in the text data to be analyzed, and the output unit outputs information regarding the extracted word string.

18. A program causing a computer to function as:

an extraction unit that analyzes data to be analyzed and extracts a subject whose appearance frequency in the data to be analyzed satisfies a predetermined condition among subjects detected in the data to be analyzed; and an output unit that outputs information regarding the extracted subject.

18-2. The program described in 18, in which the extraction unit is caused to function as a person extraction unit that analyzes moving image data to be analyzed and extracts a person whose appearance frequency in the moving image data to be analyzed satisfies a predetermined condition among persons detected in the moving image data to be analyzed, and in which the output unit outputs information regarding the extracted person.

18-3. The program described in 18-2, in which the moving image data to be analyzed includes a plurality of pieces of child data captured at a plurality of places different from each other different from each other, and the person extraction unit determines whether or not each person detected in the moving image data to be analyzed appears in each of the plurality of pieces of child data, and calculates an appearance frequency for each detected person based on a result of the determination.

18-4. The program described in 18-2, in which the moving image data to be analyzed includes moving image data captured at the same place over a predetermined time period, and the person extraction unit analyzes the moving image data to be analyzed in units of time windows, each time window having a time width smaller than the predetermined time period, determines whether or not each person detected in the moving image data to be analyzed appears in each of a plurality of the time windows, and calculates an appearance frequency of each detected person based on a determination result.

18-5. The program described in 18-4, further causing the computer to function as an input receiving unit that receives a user input to set a time width of the time window.

18-6. The program described in 18-4, further causing the computer to function as an input receiving unit that receives a user input to individually set a start position and an end position of each of a plurality of the time windows.

18-7. The program described in any one of 18-2 to 18-6, in which the person extraction unit extracts a predetermined number of persons in descending order of appearance frequency.

18-8. The program described in any one of 18-2 to 18-6, in which the person extraction unit extracts a person whose appearance frequency is equal to or higher than a predetermined level.

18-9. The program described in any one of 18-2 to 18-8, in which the output unit outputs an image of the person acquired from the moving image data to be analyzed as information regarding the extracted person.

18-10. The program described in 18-9, in which the output unit displays a list of a plurality of images of the person acquired from a plurality of different frames as information regarding the extracted person.

18-11. The program described in 18-9 or 18-10, in which the output unit outputs an appearance frequency in the moving image data to be analyzed as information regarding the extracted person.

18-12. The program described in any one of 18-9 to 18-11, in which the output unit displays information regarding each of a plurality of extracted persons as a list in descending order of appearance frequency.

18-13. The program described in any one of 18-9 to 18-12, in which the moving image data to be analyzed includes moving image data captured at the same place over a predetermined time period, and the output unit outputs information indicating a temporal change in appearance frequency as information regarding the extracted person.

18-14. The program described in any one of 18-9 to 18-12, in which the moving image data to be analyzed includes a plurality of pieces of child data captured at a plurality of places different from each other different from each other, and the output unit outputs information indicating at least one of a place where the person has appeared and the number of places where the person has appeared as information regarding the extracted person.

18-15. The program described in any one of 18-2 to 18-14, in which the person extraction unit executes processing to determine whether or not a person detected in a frame to be processed is similar to a person detected in a previously processed frame in outer appearance feature values by a predetermined level or more, and the program causes the computer to further function as a unit that receives a user input to set the predetermined level in the processing.

18-16. The program described in 18, in which the extraction unit is caused to function as a word string extraction unit that analyzes text data to be analyzed and extracts a word string whose appearance frequency in the text data to be analyzed satisfies a predetermined condition among word strings detected in the text data to be analyzed, and the output unit outputs information regarding the extracted word string.

The invention claimed is:

1. A data processing apparatus, comprising:
a memory comprising instructions; and
at least one processor configured to execute the instructions to implement:
an extraction unit that analyzes data to be analyzed and extracts a subject whose appearance frequency in the data to be analyzed satisfies a predetermined condition among subjects detected in the data to be analyzed; and
an output unit that outputs information regarding the extracted subject,
wherein the appearance frequency comprises a number of appearances or an appearance rate,
wherein the extraction unit comprises a person extraction unit that analyzes moving image data to be analyzed and extracts a person whose appearance frequency in the moving image data to be analyzed satisfies a predetermined condition among persons detected in the moving image data to be analyzed,
wherein the output unit outputs information regarding the extracted person, and
wherein the person extraction unit extracts a predetermined number of persons in descending order of appearance frequency.

2. The data processing apparatus according to claim 1,
wherein the moving image data to be analyzed comprises a plurality of pieces of child data captured at a plurality places different from each other, and
the person extraction unit determines whether or not each person detected in the moving image data to be analyzed appears in each of the plurality of pieces of child data, and calculates an appearance frequency for each detected person based on a result of the determination.

3. The data processing apparatus according to claim 2claim 1,
wherein the moving image data to be analyzed comprises moving image data captured at the same place over a predetermined time period, and
the person extraction unit analyzes the moving image data to be analyzed in units of time windows, each time window having a time width smaller than the predetermined time period, determines whether or not each person detected in the moving image data to be analyzed appears in each of a plurality of the time windows, and calculates an appearance frequency of each detected person based on a determination result.

4. The data processing apparatus according to claim 3, wherein the at least one processor is further configured to execute the instructions to implement:
an input receiving unit that receives a user input to set a time width of the time window.

5. The data processing apparatus according to claim 3, wherein the at least one processor is further configured to execute the instructions to implement:
an input receiving unit that receives a user input to individually set a start position and an end position of each of a plurality of the time windows.

6. The data processing apparatus according to claim 1,
wherein the person extraction unit extracts a person whose appearance frequency is equal to or higher than a predetermined level.

7. The data processing apparatus according to claim 1,
wherein the output unit outputs an image of the person acquired from the moving image data to be analyzed as information regarding the extracted person.

8. The data processing apparatus according to claim 7,
wherein the output unit displays a list of a plurality of images of the person acquired from a plurality of frames different from each other as information regarding the extracted person.

9. The data processing apparatus according to claim 7,
wherein the output unit outputs an appearance frequency in the moving image data to be analyzed as information regarding the extracted person.

10. The data processing apparatus according to claim 7,
wherein the output unit displays information regarding each of a plurality of extracted persons as a list in descending order of appearance frequency.

11. The data processing apparatus according to claim 7,
wherein the moving image data to be analyzed comprises moving image data captured at the same place over a predetermined time period, and the output unit outputs information indicating a temporal change in appearance frequency as information regarding the extracted person.

12. The data processing apparatus according to claim 7, wherein the moving image data to be analyzed comprises a plurality of pieces of child data captured at a plurality of places different from each other, and
the output unit outputs information indicating at least one of a place where the person has appeared and the number of places where the person has appeared as information regarding the extracted person.

13. The data processing apparatus according to claim 1, wherein the person extraction unit executes processing to determine whether or not a person detected in a frame to be processed is similar to a person detected in a previously processed frame in outer appearance feature values by a predetermined level or more, and
the data processing apparatus further comprises a unit that receives a user input to set the predetermined level in the processing.

14. A data processing method executed by a computer, the method comprising:
an extraction step of analyzing data to be analyzed and extracting a subject whose appearance frequency in the data to be analyzed satisfies a predetermined condition among subjects detected in the data to be analyzed; and
an output step of outputting information regarding the extracted subject,
wherein the appearance frequency comprises a number of appearances or an appearance rate,
wherein the extraction step comprises analyzing moving image data to be analyzed and extracting a person whose appearance frequency in the moving image data to be analyzed satisfies a predetermined condition among persons detected in the moving image data to be analyzed,
wherein the output step comprises outputting information regarding the extracted person, and
wherein the extraction step further comprises extracting a predetermined number of persons in descending order of appearance frequency.

15. A non-transitory storage medium storing a program causing a computer to function as:
an extraction unit that analyzes data to be analyzed and extracts a subject whose appearance frequency in the data to be analyzed satisfies a predetermined condition among subjects detected in the data to be analyzed; and
an output unit that outputs information regarding the extracted subject,
wherein the appearance frequency comprises a number of appearances or an appearance rate,
wherein the extraction unit comprises a person extraction unit that analyzes moving image data to be analyzed and extracts a person whose appearance frequency in the moving image data to be analyzed satisfies a predetermined condition among persons detected in the moving image data to be analyzed,
wherein the output unit outputs information regarding the extracted person, and
wherein the person extraction unit extracts a predetermined number of persons in descending order of appearance frequency.

16. A data processing apparatus, comprising:
a memory comprising instructions; and
at least one processor configured to execute the instructions to implement:
an extraction unit that analyzes data to be analyzed and extracts a subject whose appearance frequency in the data to be analyzed satisfies a predetermined condition among subjects detected in the data to be analyzed; and
an output unit that outputs information regarding the extracted subject,
wherein the appearance frequency comprises a number of appearances or an appearance rate,
wherein the extraction unit comprises a person extraction unit that analyzes moving image data to be analyzed and extracts a person whose appearance frequency in the moving image data to be analyzed satisfies a predetermined condition among persons detected in the moving image data to be analyzed,
wherein the output unit outputs information regarding the extracted person,
wherein the output unit outputs an image of the person acquired from the moving image data to be analyzed as information regarding the extracted person,
wherein the moving image data to be analyzed comprises a plurality of pieces of child data captured at a plurality of places different from each other, and
wherein the output unit outputs information indicating at least one of a place where the person has appeared and the number of places where the person has appeared as information regarding the extracted person.

17. The data processing apparatus according to claim 16, wherein the moving image data to be analyzed comprises a plurality of pieces of child data captured at a plurality places different from each other, and
the person extraction unit determines whether or not each person detected in the moving image data to be analyzed appears in each of the plurality of pieces of child data, and calculates an appearance frequency for each detected person based on a result of the determination.

18. The data processing apparatus according to claim 16, wherein the moving image data to be analyzed comprises moving image data captured at the same place over a predetermined time period, and
the person extraction unit analyzes the moving image data to be analyzed in units of time windows, each time window having a time width smaller than the predetermined time period, determines whether or not each person detected in the moving image data to be analyzed appears in each of a plurality of the time windows, and calculates an appearance frequency of each detected person based on a determination result.

19. The data processing apparatus according to claim 18, wherein the at least one processor is further configured to execute the instructions to implement:
an input receiving unit that receives a user input to set a time width of the time window.

20. The data processing apparatus according to claim 18, wherein the at least one processor is further configured to execute the instructions to implement:
an input receiving unit that receives a user input to individually set a start position and an end position of each of a plurality of the time windows.

21. The data processing apparatus according to claim 16, wherein the person extraction unit extracts a person whose appearance frequency is equal to or higher than a predetermined level.

22. The data processing apparatus according to claim 16, wherein the output unit outputs an image of the person acquired from the moving image data to be analyzed as information regarding the extracted person.

23. The data processing apparatus according to claim 22, wherein the output unit displays a list of a plurality of images of the person acquired from a plurality of frames different from each other as information regarding the extracted person.

24. The data processing apparatus according to claim 22, wherein the output unit outputs an appearance frequency in the moving image data to be analyzed as information regarding the extracted person.

25. The data processing apparatus according to claim 22, wherein the output unit displays information regarding each of a plurality of extracted persons as a list in descending order of appearance frequency.

26. The data processing apparatus according to claim 22, wherein the moving image data to be analyzed comprises moving image data captured at the same place over a predetermined time period, and
the output unit outputs information indicating a temporal change in appearance frequency as information regarding the extracted person.

27. The data processing apparatus according to claim 16, wherein the person extraction unit executes processing to determine whether or not a person detected in a frame to be processed is similar to a person detected in a previously processed frame in outer appearance feature values by a predetermined level or more, and
the data processing apparatus further comprises a unit that receives a user input to set the predetermined level in the processing.

28. A data processing method executed by a computer, the method comprising:
an extraction step of analyzing data to be analyzed and extracting a subject whose appearance frequency in the data to be analyzed satisfies a predetermined condition among subjects detected in the data to be analyzed; and
an output step of outputting information regarding the extracted subject,
wherein the appearance frequency comprises a number of appearances or an appearance rate,
wherein the extraction step comprises analyzing moving image data to be analyzed and extracting a person whose appearance frequency in the moving image data to be analyzed satisfies a predetermined condition among persons detected in the moving image data to be analyzed,
wherein the output step comprises outputting information regarding the extracted person,
wherein the output step further comprises outputting an image of the person acquired from the moving image data to be analyzed as information regarding the extracted person,
wherein the moving image data to be analyzed comprises a plurality of pieces of child data captured at a plurality of places different from each other, and
wherein the output step further comprises outputting information indicating at least one of a place where the person has appeared and the number of places where the person has appeared as information regarding the extracted person.

29. A non-transitory storage medium storing a program causing a computer to function as:
an extraction unit that analyzes data to be analyzed and extracts a subject whose appearance frequency in the data to be analyzed satisfies a predetermined condition among subjects detected in the data to be analyzed; and
an output unit that outputs information regarding the extracted subject,
wherein the appearance frequency comprises a number of appearances or an appearance rate,
wherein the extraction unit comprises a person extraction unit that analyzes moving image data to be analyzed and extracts a person whose appearance frequency in the moving image data to be analyzed satisfies a predetermined condition among persons detected in the moving image data to be analyzed,
wherein the output unit outputs information regarding the extracted person,
wherein the output unit outputs an image of the person acquired from the moving image data to be analyzed as information regarding the extracted person,
wherein the moving image data to be analyzed comprises a plurality of pieces of child data captured at a plurality of places different from each other, and
wherein the output unit outputs information indicating at least one of a place where the person has appeared and the number of places where the person has appeared as information regarding the extracted person.

* * * * *

UNITED STATES PATENT AND TRADEMARK OFFICE
CERTIFICATE OF CORRECTION

PATENT NO. : 10,867,162 B2  
APPLICATION NO. : 15/773239  
DATED : December 15, 2020  
INVENTOR(S) : Jianquan Liu et al.

Page 1 of 1

It is certified that error appears in the above-identified patent and that said Letters Patent is hereby corrected as shown below:

In the Specification

Column 13, Description of Embodiments, Line 32; After "unit", insert --10--

Column 17, Description of Embodiments, Line 36; After "unit", insert --40--

In the Claims

Column 24, Lines 18-19; In Claim 3, delete "claim 2claim 1," and insert --claim 1,-- therefor Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*